United States Patent Office 2,757,072
Patented July 31, 1956

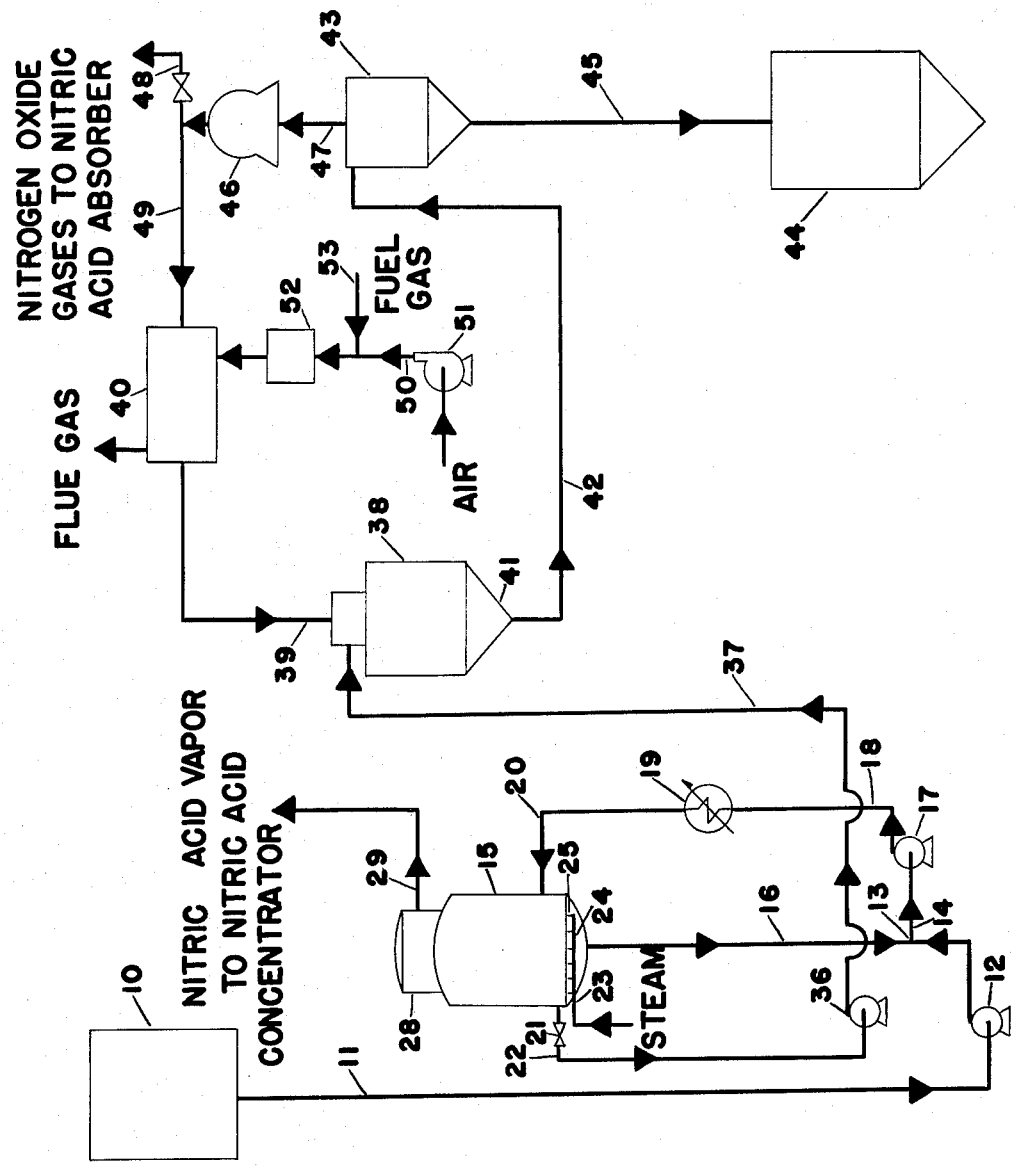

2,757,072

RECOVERY OF FREE AND COMBINED NITRIC ACID FROM METAL NITRATE LIQUORS

Numer Martin Kapp, Swarthmore, and William Whitney Weinrich, Wallingford, Pa., assignors, by mesne assignments, to the United States of America as represented by the United States Atomic Energy Commission Application November 19, 1953, Serial No. 393,249

5 Claims. (Cl. 23—158)

This invention relates to a method for the economic recovery of nitric acid from liquors. More particularly, the invention relates to a continuous method for the recovery of both free and combined nitric acid from metal nitrate liquors obtained in uranium ore processing.

In certain presently used uranium processes, liquors containing free nitric acid and metal nitrates are neutralized with lime to produce a slurry containing dissolved metal nitrates, chiefly calcium nitrate, and precipitated metal hydroxides. The slurry is filtered to produce a filter cake consisting of metal hydroxides and other solids, and a filtrate containing dissolved metal nitrates. The filtrate is discarded and the nitric acid values contained therein are lost. In addition, discharge of the filtrate as waste poses a radioactive stream pollution problem. The filter cake of wet metal hydroxides is conveyed to a dump for storage and, by reason of its water content and bulk, is in an undesirable form for conveying, storage, shipment or additional processing. In addition, the use of relatively large amounts of lime to neutralize the raffinate liquors is an appreciable item of expense in the process.

It is an object of the present invention to provide a continuous method for the economic recovery of free and combined nitric acid from metal nitrate liquors, and to concomitantly solve safety and waste disposal problems associated with the disposition of such liquors.

A detailed description of the invention as applied to a dilute metal nitrate solution is given below with reference to the accompanying drawing, which illustrates an embodiment of the invention schematically by flow diagram.

Dilute metal nitrate solution is continuously drawn from storage tank 10 though line 11 with the aid of pump 12, and introduced into a forced circulation evaporator system at point 13 through line 14. At point 13 the dilute nitrate solution meets a stream of hot concentrated metal nitrate recycle solution continuously discharging from the evaporator flash drum 15 through line 16.

The dilute nitrate solution and the hot concentrated recycle solution are continuously mixed in line 14 and pump 17, which forces the resulting mixture through line 18 and heat exchanger 19. During its passage through heat exchanger 19, the liquid mixture is maintained under a hydraulic head and is heated somewhat to the desired temperature. This temperature is preferably maintained slightly below the boiling point of the liquid for the reasons given below. The hot mixture then passes through line 20 and discharges into evaporator flash drum 15, which is generally operated at a temperature in the range of about 240° to about 310° F.

A temperature rise of preferably only 5° to 10° F. is produced in the liquid mixture by maintaining a high recycle to product ratio in the forced circulation evaporation system. This is achieved by proper design of pump 17. By this mode of operation, boiling in heat exchanger 19 is prevented and the scaling tendency of the heated liquid mixture in exchanger 19, which contains scale formers such as calcium sulfate, is counteracted and minimized. Also, the danger of corrosion in the heat exchanger is minimized because boiling in the exchanger is prevented.

In evaporator 15, the hot liquid mixture, wherein a high salt concentration is maintained by operating at a high recycle to product ratio, may be sparged if desired with open steam which can be admitted into the bottom of evaporator 15 through line 23, steam manifold 24 and sparge nozzles 25. Substantially complete removal of water and free nitric acid is effected and the product, comprising metal nitrate hydrates in molten condition, is withdrawn from the evaporator 15 through product line 22. The recycle bottoms are withdrawn from evaporator 15 through bottoms line 16, and are mixed with the dilute metal nitrate feed solution at point 13, as described above.

The water and free nitric acid vapors are carried upward in evaporator 15, preferably through a mist separator 28, wherein entrained material is separated from the vapor stream, which in turn is carried through line 29 to a nitric acid concentrator (not shown). In the nitric acid concentrator more than about 99 percent of the nitric acid in the vapor may be recovered as 60 weight percent nitric acid.

The bottoms product withdrawn from evaporator 15 through line 22 is essentially a mixture of hydrated metal nitrates having a freezing point as high as about 200° F. or higher. For this reason, valve 21 and line 22, as well as other lines carrying this material, are steam jacketed in practice to prevent freezing of the metal nitrate mixture, which is transferred by means of a pump 36 through a line 37 to spray calciner chamber 38.

In the forced circulation evaporation operation described above, it is desired to produce a highly concentrated product for two reasons. First, the removal of as much water as possible in the evaporator reduces the load on the calciner 38 (described below). This is desirable since evaporation is inherently less expensive than calcining. Second, more complete evaporation of free nitric acid is possible from more concentrated salt solutions than from relatively dilute solutions.

Into calciner chamber 38, through line 39, is introduced a continuous stream of recirculated hot gases. Simultaneously, the hot liquid mixture of metal nitrates, fed continuously to calciner chamber 38 through line 37, is atomized by any suitable method and is fed continuously into and mixed with the hot recirculated gases in the upper portion of calciner 38. These hot recirculated gases are continuously preheated in gas heater 40 to a temperature sufficient to dehydrate and denitrate the atomized metal nitrate particles mixed therewith, and produce steam, nitrogen oxides and metal oxide particles. In order to supply all the heat required for dehydration and denitration of the metal nitrates, the hot gases are preheated to a temperature in the range of about 450° to 1600° F., preferably to a temperature of about 1200° F. at the chamber inlet when processing metal nitrates produced during uranium processing. At these temperatures, there is no appreciable decomposition of valuable nitrogen oxides to valueless nitrogen and oxygen. The calcining operation is preferably controlled so that the outlet gaseous material is withdrawn from calciner 38 at a temperature of about 350° to 1450° F., preferably about 700° F. The solids temperature at the outlet 41 of calciner 38 should be in the range of about 300° to 1400° F. and is preferably not less than about 600° F. for metal nitrates encountered in uranium processing. Also, the time of contact of the atomized metal nitrate with the hot recirculated gases in calciner 38 is preferably regulated to be in the range of about 1 to 50 seconds.

The hot mixture of gases and solids is transferred through line 42 into a solids separator such as a pressure drop cyclone 43, for example. As the mixture passes continuously through cyclone 43, the metal oxides and other solids are continuously separated from the gases of the mixture by the action of centrifugal force on the solid particles. The solids are collected in the bottom of cyclone 43 and are transferred to solids storage container 44 through line 45. The separated gaseous component containing the nitrogen oxide gases produced by denitrating the metal nitrates, is conveyed to recirculation blower 46 through line 47. A portion of the gases, equivalent in quantity to the gases produced in calciner chamber 38, is withdrawn from the cycle through valved line 48 and transported to a nitric acid absorption system (not shown), where entrained solids are removed from the gases and the gases are cooled and absorbed in water to produce concentrated nitric acid. The exact ratio of withdrawn product gases to total gas volume depends on the operating temperatures and the overall heat requirements of the process. In a particular application of the method of the invention a value of 1 to 8 has been found to be satisfactory.

The remaining portion of the gases is recirculated to the inlet of calciner 38 through line 49, gas heater 40 and line 39, to complete the cycle. In gas heater 40, which is preferably a fin-tube heater, the recycle gases are reheated from about 700° F. to about 1200° F. (when denitrating metal nitrates obtained from uranium processing) on the shell or fin side by hot air inside the tubes of the heater 40. The hot air is produced from air furnished to line 50 by blower 51. The air in line 50 may be heated in airline burner 52 in fuel gas burners (not shown) inserted in the end of each heat transfer tube. Fuel gas may be supplied to the burners through line 53. Although a particular method of heating the gases has been described above, it is understood that other methods of performing this operation may be used.

The following example will serve to illustrate the operation of the spray calcining step of the method of the invention as applied to the recovery of combined nitric acid from molten metal nitrates.

Example

Molten metal nitrate feed obtained as described above from uranium ore processing is continuously introduced at the rate of 1000 pounds per hour into calciner chamber 38 through line 37 in atomized form at 250° F. in admixture with a continuous stream of hot recirculated gases fed at the rate of 7350 pounds per hour and at a temperature of 1200° F. The calciner is designed so that the metal nitrates and the hot gases have a residence time in the calciner chamber of about 12 seconds. The effluent from the calciner chamber is a mixture of hot gases and solids. In this mixture, the solids temperature is about 650° F. and the gas temperature is about 700° F.

This hot gas-solids mixture is continuously fed to a cyclone separator 43 which separates the solids from the gas phase. About 1/8 of the volume of the gas phase, containing as much as about 35 percent by volume of oxides of nitrogen, is continuously withdrawn from the system. The remaining 7/8 of the total gas volume is continuously recirculated to calciner chamber 38 through a gas heater 40 where the gases are again heated to about 1200° F. The separated solids obtained from cyclone separator 43 are primarily metal oxides in freely flowing powdered form. The metal nitrates in the feed that are decomposable at about 650° F. are substantially completely freed of combined nitrogen.

The above-described calcining method possesses important advantages. In conventional spray dryer operation, heat is supplied to the dryer chamber by the direct introduction of heated air without recycle of gases. If such a system were employed in denitration of metal nitrates, the product gases would contain less than about 4 mol. percent nitrogen oxides. The absorption of such low concentrations of nitrogen oxide gases would be an expensive operation requiring a relatively high investment for absorption equipment. By the use of the gas recirculation system of the present invention, wherein a recycle ratio of about 7 volumes of recirculation gases to 1 volume of product gases may be used, for example, product gases high in nitrogen oxide concentration are obtained, and an absorber system of reasonable size is employed. Heat is added indirectly to the recycle gases, as described above, and no air enters the denitration system except through a moderate amount of in-leakage.

Also, the calcining operation is carried out at subatmospheric pressure by applying suction on line 48. There is, therefore, substantially no tendency for gases and solid particles to leak outward from the calcining and separating equipment into the atmosphere, and danger of contamination of the atmosphere by radioactive particles is minimized.

Furthermore, the metal oxide solids produced in the method of the invention are dry, not bulky, and are in convenient form for conveying, storage, shipment or additional processing. In addition, there is no liquid waste stream produced in the process of the invention and the dangers of stream pollution by possible radioactive liquid wastes is avoided.

Obviously there are other applications and modifications of the method of the present invention than those mentioned above. It is to be understood, therefore, that the scope of this invention is to be determined only as required by the following claims when construed in the light of the prior art.

What is claimed is:

1. A method for the recovery of nitric acid from aqueous metal nitrate liquors which comprises the steps of concentrating the liquor by passing the same in an enclosed cyclic path through a heater and an evaporating chamber while heating the liquor under a hydraulic head to within a few degrees of boiling temperature in the heater to produce nitric acid containing vapors and molten metal nitrate hydrates, collecting the vapors to recover nitric acid therefrom, denitrating and dehydrating the molten material in a spray calciner by atomizing the same and introducing the atomized material into the calciner in intimate contact with a recirculated stream of hot gases to produce a mixture comprising metal oxides, nitric oxides and hot gases, recirculating the hot gases thus produced in an enclosed cyclic path through a centrifugal solids separator, a blower, a gas heater and the calciner, recovering separated solid metal oxides from the solids separator, and withdrawing a portion of the nitrogen oxide-containing recirculated gases from the recirculation cycle to produce nitric acid therefrom.

2. A continuous method for the recovery of nitric acid from concentrated metal nitrate liquors which comprises continuously circulating a relatively large volume of hot nitrogen oxide-containing gases in a cyclic path including four zones in sequence, continuously atomizing said liquors and introducing them into said cyclic path at a first, calcining zone to denitrate the metal nitrate and to produce metal oxides and a relatively small volume of nitrogen oxides mixed with said gases, at the second zone in said path separating the solid metal oxide from said gases, at the third zone in said path withdrawing a volume of said gases equivalent to that produced in said first zone and at the fourth zone in said path heating the circulating gases to a denitration temperature, the gases returning then to said first zone.

3. A continuous method for the recovery of nitric acid from concentrated metal nitrate liquors which comprises continuously circulating a relatively large volume of hot nitrogen oxide-containing gases in a cyclic path including four zones in sequence, continuously atomizing said liquors and introducing them into said cyclic path at a first, calcining zone to denitrate the metal nitrate and to produce metal oxides and a relatively small volume of nitrogen oxides mixed with said gases, at the second zone in said path separating the solid metal oxides from said gases, at the third zone in said path withdrawing a volume of said gases equivalent to that produced in said first zone and at the fourth zone in said path heating the circulating gases to a denitration temperature in the range of 450–1600° F., the gases returning then to said first zone.

4. A continuous method for the recovery of nitric acid from concentrated metal nitrate liquors which comprises continuously circulating a relatively large volume of hot nitrogen oxide-containing gases in a cyclic path including four zones in sequence, continuously atomizing said liquors and introducing them into said cyclic path at a first, calcining zone and retaining them in said first zone for about 1 to 50 seconds to denitrate the metal nitrates and to produce metal oxides and a relatively small volume of nitrogen oxides mixed with said gases, at the second zone in said path separating the solid metal oxides from said gases, at the third zone in said path withdrawing a volume of said gases equivalent to that produced in said first zone and at the fourth zone in said path heating the circulating gases to a denitration temperature of 1200° F., the gases then returning to said first zone.

5. The method of claim 2 in which the liquors are introduced into the first zone at a rate that yields a volume of nitrogen oxide of about $\frac{1}{7}$ of the volume of hot gases continuously circulating in the cyclic path.

References Cited in the file of this patent

UNITED STATES PATENTS

| | | |
|---|---|---|
| 982,466 | Blackmore | Jan. 24, 1911 |
| 1,652,119 | Halvorsen | Dec. 6, 1927 |
| 2,089,945 | Converse et al. | Aug. 17, 1937 |
| 2,127,504 | Derr et al. | Aug. 23, 1938 |
| 2,681,268 | Nossen | June 15, 1954 |